Figures 1, 2:
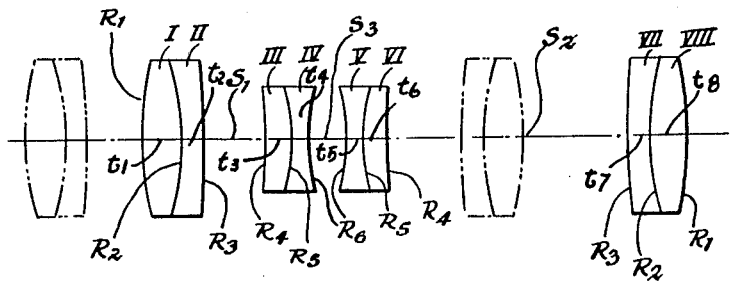

March 31, 1964  R. M. WALTERS  3,127,466
VARIABLE MAGNIFICATION LENS SYSTEM FOR MICROSCOPES
Filed April 12, 1961

| MAGNIFICATION | $S_1$ (mm) | $S_2$ (mm) |
|---|---|---|
| .55 | 6.1248 | 23.7009 |
| .60 | 8.225 | 23.008 |
| .70 | 11.525 | 21.662 |
| .80 | 14.000 | 20.236 |
| .90 | 15.924 | 18.850 |
| 1.00 | 17.464 | 17.464 |
| 1.10 | 18.724 | 16.078 |
| 1.20 | 19.774 | 14.692 |
| 1.30 | 20.663 | 13.306 |
| 1.40 | 21.424 | 11.920 |
| 1.50 | 22.084 | 10.535 |
| 1.60 | 22.662 | 9.149 |
| 1.70 | 23.171 | 7.763 |
| 1.80 | 23.624 | 6.377 |
| 1.90 | 24.029 | 4.991 |

*INVENTOR.*
*RICHARD M. WALTERS*
BY
*Beau, Brooks, Buckley + Beau*
ATTORNEYS

United States Patent Office 3,127,466
Patented Mar. 31, 1964

3,127,466
VARIABLE MAGNIFICATION LENS SYSTEM FOR MICROSCOPES
Richard M. Walters, Kenmore, N.Y., assignor to American Optical Company, Southbridge, Mass.
Filed Apr. 12, 1961, Ser. No. 102,494
1 Claim. (Cl. 88—57)

This invention relates to a lens system having certain movable components for effecting a change of magnification.

More specifically, the present invention is directed to a lens system as generally described above which is particularly adapted for use in conjunction with microscopes. In such instruments, space considerations are of paramount importance and it is therefore of primary concern in connection with the present invention to provide a system as generally described above wherein the maximum diameter of the components is maintained at a minimum, where the overall length of the system is maintained at a minimum and wherein the total space required for the system throughout its total range of magnification is also maintained at a minimum, all of the above while maintaining a system well corrected for spherical aberration, coma and axial color.

Still further, the present invention is directed to a lens system as above described which is usable in an optical system where there is parallel light and wherein a sharp image is produced throughout the range of adjustability without the need for refocusing. More specifically, the present invention encompasses a system having fixed conjugates at infinity and wherein the magnification may be varied continuously throughout the range of from about ½× to about 2× without the necessity of any refocusing, the image remaining sharp throughout the range of adjustment.

A further object of this invention is to provide a system as above described wherein two groups of lens components are utilized and wherein one-half of each such group is identical to the other half of such group. More specifically, the present invention relates to a system as above wherein a pair of positive lens components are disposed, in oppositely facing relationship, on opposite sides of a pair of negative lens components, the negative lens components being disposed in oppositely facing back-to-back but spaced relationship wherein the diameter of the negative lens components is in the order of 10 millimeters and the diameter of the positive lens components is in the order of 15 millimeters, the maximum length of the system being slightly less than 59 millimeters.

Another object of this invention is to provide a system in accordance with the immediately preceding object wherein each lens component comprises a doublet and wherein each doublet is individually corrected for spherical aberration, coma and axial color.

The foregoing and other objects, advantages and characterizing features of my invention will become clearly apparent from the ensuing detailed description of one, illustrative embodiment thereof, taken in conjunction with the accompanying drawings illustrating the same wherein like reference numerals denote like parts in each view, and wherein:

FIG. 1 is a diagrammatic view showing the optical system in accordance with the present invention and illustrating, in full and dotted lines, the variable spacing between the several components thereof; and FIG. 2 is a table depicting the variations in the distances $s_1$ and $s_2$, relating to FIG. 1, to produce the continuously variable range of magnification, certain finite values which are specified in the table.

Referring to FIG. 1, the optical system in accordance with the present invention will be seen to consist of two groups of lenses, the first group embracing the lenses I and II and the lenses VII and VIII and the other group of which comprises the lenses III and IV an the lenses V and VI. Of these two groups of lenses, it will be manifest that lenses I and VIII and II and VII are identical in the first mentioned group and that lenses III and VI and lenses IV and V are identical in the second mentioned group.

Basically, it will be seen that the first group of lenses consists of two identical positive doublets which are disposed in axial alignment but in oppositely facing direction. Similarly, the second group will be seen to consist of two identical negative doublets also disposed in oppositely facing relationship.

The present system is specifically adapted for use in conjunction with microscopes and for that reason, certain space limitations are imposed upon the system while at the same time, the same must be well corrected in order to render the system usable in a microscope system. To this end, it will be understood that the two negative doublets are disposed in fixed relationship with respect to each other and that the spacing between the two positive doublets and the negative group is variable in each instance. This may be accomplished by holding one of the positive doublets fixed and moving the negative components as a group as well as the other positive doublet relative thereto or it may be achieved by holding the negative group of lenses in fixed relationship while varying the spacing of the two positive doublets relative thereto.

Thus, the present invention embraces the specific relationships set forth in Tables I and II below. It will be noted that the spacing between the relatively fixed negative doublets is 4.0 millimeters, that the diameter of the negative group is 10.0 millimeters and that the diameter of the positive lens components is 15.0 millimeters. It will be clearly evident that the maximum length of the system occurs when magnification is equal to 1.00 and is, at that time, 58.928 millimeters. If adjustment is accomplished by holding one of the positive doublets fixed, the maximum space requirement for the system also equals 58.928 millimeters. By holding the negative group fixed, however, the space required is about 77 millimeters.

In the following tables, $n_D$ is the index of the refraction of the optical material for the D line of sodium, $v$ is the reciprocal dispersion of the optical material, and the thicknesses $t$ and radii $R$ are in millimeters.

Table I

| Lens | $n_D$ | $v$ | Radii and Thickness | |
|---|---|---|---|---|
| I, VIII | 1.5725 | 57.4 | $R_1 = +33.14, -33.14$ | $t_1$ and $t_8 = 4.0$ |
|  |  |  | $R_2 = -23.07, +23.07$ |  |
| II, VII | 1.689 | 30.9 | $R_2 = -23.07, +23.07$ | $t_2$ and $t_7 = 2.0$ |
|  |  |  | $R_3 = -98.10, +98.10$ |  |

Table II

| Lens | $n_D$ | $v$ | Radii and Thickness | |
|---|---|---|---|---|
| III, VI | 1.689 | 30.9 | $R_4 = -72.96, +72.96$ | $t_3$ and $t_6 = 2.5$ |
|  |  |  | $R_5 = -14.25, +14.25$ |  |
| IV, V | 1.5725 | 57.4 | $R_5 = -14.25, +14.25$ | $t_4$ and $t_5 = 1.5$ |
|  |  |  | $R_6 = +18.05, -18.05$ |  |

Whereas only one specific example of the invention

I claim:

A variable magnification lens system for microscopes and having fixed conjugates at infinity, comprising a pair of identical negative lens components disposed in fixed, spaced relationship and in oppositely facing relation, and a pair of identical positive lens components disposed on opposite sides of said negative components and in oppositely facing relation to each other, each of said positive components consisting of a doublet, one of which is exemplified according to the following in which $n_D$ is the index of refraction and $v$ is the abbe number of the glass used, the radii R and thickness $t$ being in millimeters:

| Lens | $n_D$ | $v$ | Radii and Thickness | |
|---|---|---|---|---|
| I | 1.5725 | 57.4 | $R_1=+33.14$ | $t_1=4.0$ |
| | | | $R_2=-23.07$ | $t_2=2.0$ |
| II | 1.689 | 30.9 | $R_3=-98.10$ | | each of the negative components consisting of a doublet, one of which is exemplified according to the following:

| Lens | $n_D$ | $v$ | Radii and Thickness | |
|---|---|---|---|---|
| III | 1.689 | 30.9 | $R_4=-72.96$ | $t_3=2.5$ |
| | | | $R_5=-14.25$ | $t_4=1.5$ |
| IV | 1.5725 | 57.4 | $R_6=+18.05$ | | the fixed spacing between negative components being 4.0 millimeters, the spacing $S_1$ between the exemplified positive and negative components and the spacing $S_2$ between the other positive and negative components being variable according to the following:

| Magnification | $S_1$ (mm.) | $S_2$ (mm.) |
|---|---|---|
| .55 | 6.1248 | 23.7009 |
| .60 | 8.225 | 23.008 |
| .70 | 11.525 | 21.662 |
| .80 | 14.000 | 20.236 |
| .90 | 15.924 | 18.850 |
| 1.00 | 17.464 | 17.464 |
| 1.10 | 18.724 | 16.078 |
| 1.20 | 19.774 | 14.692 |
| 1.30 | 20.663 | 13.306 |
| 1.40 | 21.424 | 11.920 |
| 1.50 | 22.084 | 10.535 |
| 1.60 | 22.662 | 9.149 |
| 1.70 | 23.171 | 7.763 |
| 1.80 | 23.624 | 6.377 |
| 1.90 | 24.029 | 4.991 |

References Cited in the file of this patent

UNITED STATES PATENTS 2,746,350    Hopkins  ---------------- May 22, 1956
2,942,519    Boughton et al.  -------- June 28, 1960